US010761973B2

United States Patent
Zanbar et al.

(10) Patent No.: US 10,761,973 B2
(45) Date of Patent: Sep. 1, 2020

(54) CODE COVERAGE THRESHOLDS FOR CODE SEGMENTS BASED ON USAGE FREQUENCY AND CHANGE FREQUENCY

(71) Applicant: ENTIT SOFTWARE LLC, Sanford, NC (US)

(72) Inventors: Alon Zanbar, Yehud (IL); Lilo Elia, Yehud (IL); Eliraz Busi, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 16/086,474

(22) PCT Filed: Mar. 28, 2016

(86) PCT No.: PCT/US2016/024480
§ 371 (c)(1),
(2) Date: Sep. 19, 2018

(87) PCT Pub. No.: WO2017/171708
PCT Pub. Date: Oct. 5, 2017

(65) Prior Publication Data
US 2019/0095315 A1 Mar. 28, 2019

(51) Int. Cl.
*G06F 9/44* (2018.01)
*G06F 11/36* (2006.01)
*G06F 11/00* (2006.01)
*G06F 11/07* (2006.01)

(52) U.S. Cl.
CPC ......... *G06F 11/3676* (2013.01); *G06F 11/36* (2013.01); *G06F 11/3604* (2013.01); *G06F 11/3628* (2013.01); *G06F 11/006* (2013.01); *G06F 11/079* (2013.01)

(58) Field of Classification Search
CPC ............ G06F 11/3688; G06F 11/3604; G06F 11/3676; G06F 17/2785; G06F 8/75; G06F 8/30; G06F 11/0709; G06F 11/006; G06F 11/3628; G06F 11/36; H04M 1/72586; G01R 31/318307
See application file for complete search history.

(56) References Cited

U.S. PATENT DOCUMENTS

| | | | |
|---|---|---|---|
| 8,448,141 B2 | 5/2013 | Blount et al. | |
| 8,464,180 B1* | 6/2013 | Kirkham | H04M 1/72586 715/810 |
| 8,495,574 B2 | 7/2013 | Harding et al. | |
| 8,495,583 B2 | 7/2013 | Bassin et al. | |
| 8,627,287 B2 | 1/2014 | Fanning et al. | |

(Continued)

OTHER PUBLICATIONS

Cobertura, "Cobertura: A Code Coverage Utility for Java," (Web Page), retrieved on Mar. 17, 2016, 1 page, available at http://cobertura.github.io/cobertura/.

(Continued)

*Primary Examiner* — Tuan A Vu

(57) ABSTRACT

In some examples, a system includes a segment identification engine and a coverage determination engine. The segment identification engine may a code segment in application code for updating a code coverage threshold applicable to the code segment. The coverage determination engine may update the code coverage threshold for the code segment based on a usage frequency of the code segment and a change frequency of the code segment.

20 Claims, 6 Drawing Sheets

(56) References Cited

U.S. PATENT DOCUMENTS

| | | | |
|---|---|---|---|
| 2005/0210452 A1 | 9/2005 | Dimpsey et al. | |
| 2008/0120602 A1 | 5/2008 | Comstock et al. | |
| 2008/0222472 A1* | 9/2008 | Grise | G01R 31/318307 714/738 |
| 2009/0144698 A1* | 6/2009 | Fanning | G06F 8/75 717/120 |
| 2010/0218031 A1* | 8/2010 | Agarwal | G06F 11/0709 714/2 |
| 2010/0268720 A1* | 10/2010 | Spivack | G06F 17/2785 707/756 |
| 2011/0145653 A1* | 6/2011 | Broadfoot | G06F 11/3604 714/38.1 |
| 2012/0233596 A1* | 9/2012 | Adler | G06F 11/3676 717/124 |
| 2014/0115565 A1* | 4/2014 | Abraham | G06F 8/30 717/128 |
| 2015/0186253 A1* | 7/2015 | Abraham | G06F 11/3688 717/124 |
| 2015/0301926 A1 | 10/2015 | Giannelos | |

OTHER PUBLICATIONS

Connolly, S., "Cobertura Plugin," (Web Page), Nov. 19, 2015, 13 pages, available at https://wiki.jenkins-ci.org/display/JENKINS/Cobertura+Plugin.

International Search Report & Written Opinion received in PCT Application No. PCT/US2016/024480, dated Dec. 28, 2016, 5 pages.

JSCover, "JSCover," (Web Page), retrived online on Mar. 17, 2016, 1 page, available at http://tntim96.github.io/JSCover/.

Mockus, A et al., "Test Coverage and Post-Verification Defects: A Multiple Case Study," (Research Paper), Empirical Software Engineering and Measurement, 2009, pp. 291-301. availbale at http://users.csc.catpoly.edu/~glisher/classes/309/doc/test-coverage-case-study.pdf.

Perez, A. et al., "A Dynamic Code Coverage Approach to Maximize Fault Localization Efficiency," (Research Paper), Dec. 5, 2013, 25 pages, available at http://haslab.uminho.pt/ruimaranhao/files/paper_1.pdf.

* cited by examiner

CODE COVERAGE THRESHOLDS FOR CODE SEGMENTS BASED ON USAGE FREQUENCY AND CHANGE FREQUENCY

BACKGROUND

With rapid advances in technology, electronic devices have become increasingly prevalent in society today. Application servers and other computing systems are but a few examples of electronic devices that may host and execute software applications. Applications are becoming increasingly complex, and may include millions of lines of code (or more). Such applications may be tested to ensure proper functionality and reliability.

BRIEF DESCRIPTION OF THE DRAWINGS

Certain examples are described in the following detailed description and in reference to the drawings.

DETAILED DESCRIPTION

Figure 1:
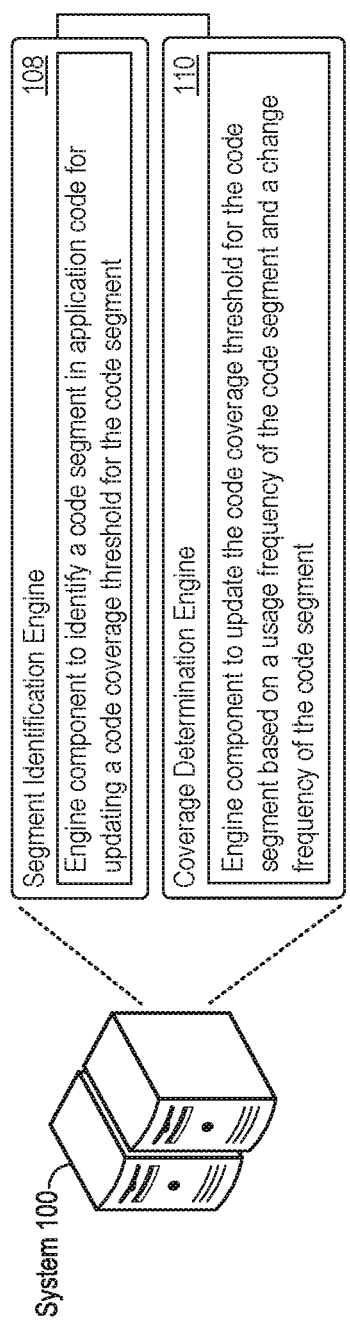
FIG. 1 shows an example of a system that supports updating code coverage thresholds for code segments based on usage frequencies and change frequencies of the code segments.

The discussion below refers to a code coverage. Code coverage may refer to a degree that code is tested by a code testing measure (e.g., test cases, a test suite, etc.). Code coverage may be specified in various ways and at varying granularities, for example as a percentage of a code segment that is tested by a code testing measure. Other examples of code coverage include a percentage of functions, statements, branches, conditions, subroutines, or other code elements in the code segment that are covered (e.g., tested) by a testing measure. A code coverage threshold may refer to a threshold level of code coverage enforced for a particular code segment. The code coverage threshold may thus specify a minimum testing requirement to ensure a code build is stable or to characterize application code as meeting a measure of stability.

To illustrate, a particular code segment (such as a particular file in application code) may have a code coverage threshold of 80%. This 80% code coverage threshold may require that a test suite be designed to test the particular code segment to cover (e.g., execute) at least 80% of the code in the particular code segment. In that regard, a code coverage threshold may specify a threshold level of testing required for code segments, which may provide increased quality, reliability, and functionality for applications.

Code coverage thresholds may have an impact on application development as resources are expended to develop test suites to satisfy the code coverage thresholds applicable to application code. Developing test suites that completely test application code in its entirety may be cumbersome, costly, and an inefficient use of resources, especially as source code of an application changes and evolves during development. Identification of code segments with relatively higher importance or relevance and setting appropriate code coverage thresholds for these code segments may increase testing efficiency and reduce cost. However, the particular code segments that may have a greater impact on the reliability and operation of application code as well as the particular application portions being developed may likewise change during different time periods of an application development process.

Examples consistent with the present disclosure may support determination of code coverage thresholds for code segments of application code based on a usage frequency and a change frequency of the code segments. As some code segments may be more important or have a greater impact on application code than others, the features described herein may account for both the usage frequency (which may indicate a higher importance relatively) and the change frequency (which may indicate relatively higher degree of code development) in code coverage threshold determinations. Thus, as application code evolves during development, examples consistent with present disclosure may support dynamic updates to the code coverage thresholds for code segments with relatively higher relevance or importance, which may result in reduced costs and increased development efficiency.

FIG. 1 shows an example of a system 100 that supports updating code coverage thresholds for code segments based on usage frequencies and change frequencies of the code segments. The system 100 may take the form of any computing system, including a single or multiple computing devices such as servers, compute nodes, desktop or laptop computers, smart phones or other mobile devices, tablet devices, embedded controllers, and more.

The system 100 may determine code coverage thresholds for code segments of application code. A code segment may refer to any portion of application code (e.g., source code of an application). Thus, example code segments include source files of an application, a group of source files, portions or code elements within a source file, or portions of application code at any other granularity. As described in greater detail below, the system 100 may determine code coverage thresholds for code segments based on both a usage frequency and a change frequency of the code segments. A usage frequency may refer to any measure that tracks the usage of a particular code segment. A change frequency may refer to any measure that tracks the rate or degree at which the code of a particular code segment changes.

By accounting for both the change frequency and the usage frequency, the system 100 may account for both the degree at which code segments can substantially impact the application (e.g., high usage segments which are important to test due to wide-spread consequences of code failure) as well as the degree at which code segments are presently being developed (e.g., segments undergoing changes and focused development during a particular time period, which are also important to test for defects). In some examples, the system 100 may periodically select particular code segments to determine (e.g., update) code coverage thresholds for. In that regard, the system 100 may account for changes to the application code that occur throughout application development. As different segments of an application are built during application development, the system 100 may account for the degree at which code segments impact the overall application and the degree at which code segments change. The system 100 may dynamically adapt, adjust, or update code coverage thresholds accordingly.

The system 100 may implement various engines to provide or support any of the features described herein. In the example shown in FIG. 1, the system 100 implements a segment identification engine 108 to identify code segments to determine a code coverage threshold for and a coverage determination engine 110 to determine a code coverage threshold for identified code segments based on both a usage frequency and a chance frequency of the identified code segments.

The system 100 may implement the engines 108 and 110 (and components thereof) in various ways, for example as hardware and programming. The programming for the engines 108 and 110 may take the form of processor-executable instructions stored on a non-transitory machine-readable storage medium, and the processor-executable instructions may, upon execution, cause hardware to perform any of the features described herein. In that regard, various programming instructions or modules of the engines 108 and 110 may implement engine components to support or provide the features described herein. The hardware for the engines 108 and 110 may include a processing resource to execute those instructions. A processing resource may include various number of processors and may be implemented through a single-processor or multi-processor architecture. In some examples, the system 100 implements multiple engines using the same system features or hardware components (e.g., a common processing resource).

The segment identification engine 108 and the coverage determination engine 110 may include components to support determination of code coverage thresholds based on usage frequency and change frequency. In the example implementation shown in FIG. 1, the segment identification engine 108 includes an engine component to identify a code segment in application code for updating a code coverage threshold for the code segment. As also shown in the example implementation of FIG. 1, the coverage determination engine 110 includes an engine component to update the code coverage threshold for the code segment based on a usage frequency of the code segment and a change frequency of the code segment. These features and more are discussed in greater detail next.

Figure 2:
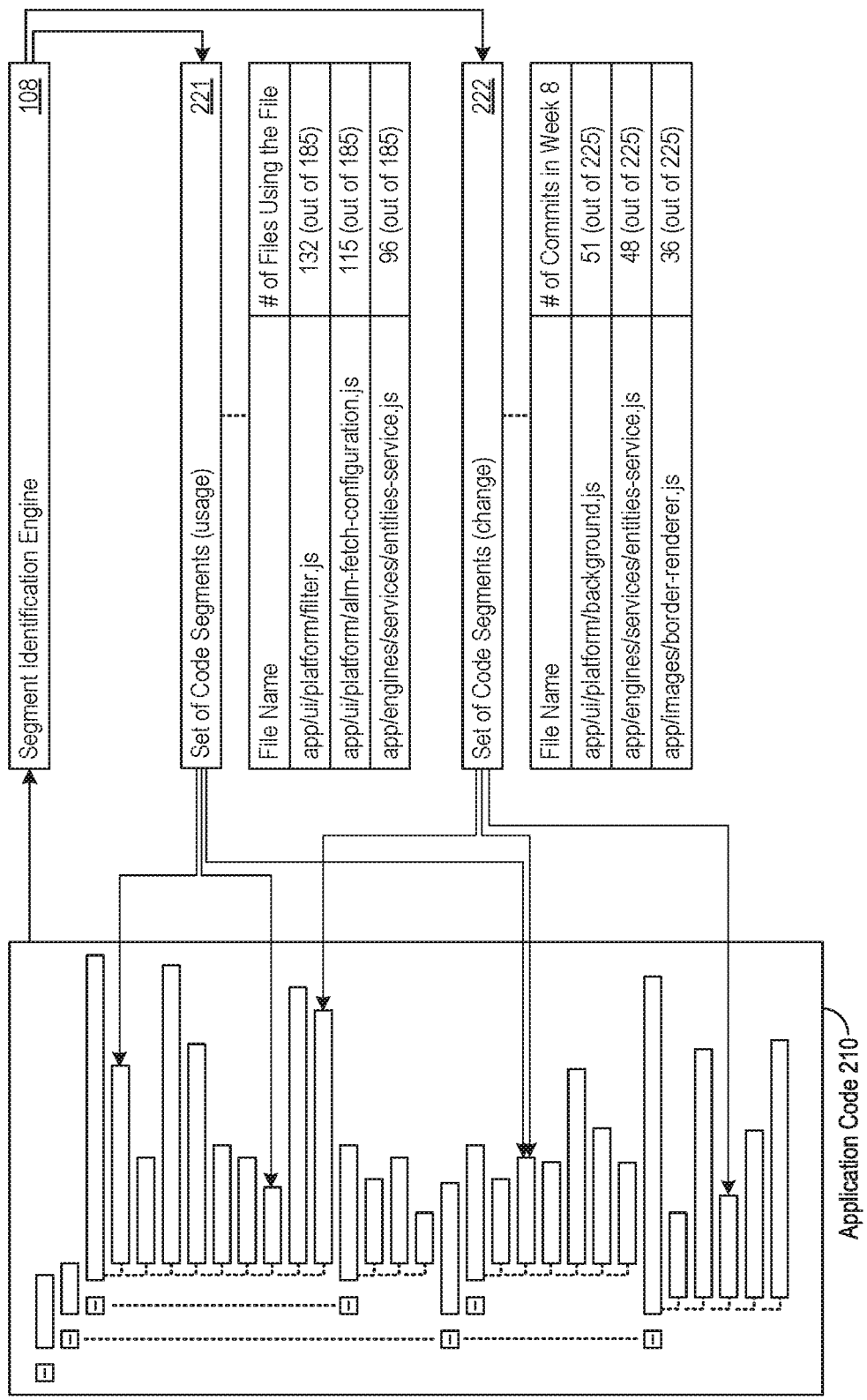
FIG. 2 shows an example of a code segments that a segment identification engine may identify from application code.

FIG. 2 shows an example of code segments that the segment identification engine 108 may identify from application code. In particular, FIG. 2 depicts an example of application code as the application code 210, which includes multiple application files arranged according to a directory structure. The application code 210 may comprise code of any programming language, platform, or framework, as examples Java, C++, JavaScript or any JavaScript framework such as AngularJS, and many more.

The segment identification engine 108 may identify particular code segments (e.g., application files) from the application code 210 for which to update code coverage thresholds. In some examples, the segment identification engine 108 may identify each (e.g., all) of the code segments of the application code 210 to determine updated code coverage thresholds. In other examples, the segment identification engine 108 may identify some, but not all, of the code segments in the application code 210 for the code coverage threshold update. The manner in which the segment identification engine 108 selects the code segments for code coverage threshold updates may be governed by any number of identification criteria. The identification criteria may aim to select particular code segments of increased importance, relevance, or impact.

In some examples, the segment identification engine 108 may identify multiple sets of code segments for the code coverage threshold update based on different identification criteria. For instance, the segment identification engine 108 may identify a first set of code segments that satisfy a usage frequency criterion (or usage frequency criteria) and a second set of code segments that satisfy a change frequency criterion (or change frequency criteria). Then, the segment identification engine 108 may select the code segments present within the first set or the second set for the code coverage threshold update.

To determine a set of code segments from that application code 210 that satisfy a usage frequency criterion, the segment identification engine 108 may determine the usage frequency for the code segments of the application code 210. Then, the segment identification engine 108 may determine which of the code segments have a usage frequency that satisfy a usage frequency criterion.

The way in which the segment identification determines the usage frequencies of the code segments may vary depending on the particular measure of usage frequency used by the segment identification engine 108. The usage frequency of a particular code segment may, for example, specify a number of other code segments of the application code 210 that use, reference, load, or otherwise access the particular code segment. Thus, for code segments in the form of application files, the segment identification engine 108 may determine the usage frequency of a particular application file by counting the number of times the particular application file is imported by other application files. For code segments in the form of services (e.g., in Angular JS), the segment identification engine 108 may determine, as the usage frequency, a number of times a particular service is injected in the application code 210, a number of application files that inject the particular service, or according to any other measure with regards to usage of the service.

As another example, the usage frequency may specify a ratio (e.g., a percentage) of use. For a particular code segment, the usage frequency may specify a percentage of the total code segments in the application code 210 that use the particular code segment. The usage frequency percentage may indicate a ratio of the number of other code segments in the application code 210 that use the code segment (numerator) to a total number of code segments in the application code 210 (denominator). To illustrate, 132 other application files out of 185 total files in the application code 210 may use a particular application file, resulting in a usage frequency of 132/185, which is 71.35%. The segment identification engine 108 may calculate this example measure of usage frequency through a determination of the number of other code segments using a particular code segment and obtaining a count of the total number of application files in the application code 210.

The segment identification engine 108 may employ any number of additional or alternative mechanisms to determine usage frequencies for code segments of the application code 210. In some examples, the segment identification engine 108 applies code analysis techniques during runtime to determine usage of different code segments in the application code 210. The code analysis techniques may include utilizing instrumentation code added into the application code 210 to log file accesses, service injections, function calls, or to record an occurrence or execution of any other code segments. Thus, during runtime, the segment identification engine 108 may collect the output of instrumentation code to determine usage frequencies of the code segments in the application code 210. As other another runtime analysis technique, the segment identification engine 108 may hook unto different function calls or other code segments to identify usages of a particular application file or other code portion. In any of the ways described above, the segment identification engine 108 may determine the usage frequencies of some or all of the code segments of the application code 210.

Upon determining the usage frequencies of the code segments, the segment identification engine 108 may determine which of the code segments have a usage frequency that satisfies a usage frequency criterion. The usage frequency criterion may specify a threshold value, e.g., a usage frequency criterion satisfied when the usage frequency of a particular code segment exceeds a threshold percentage value (e.g., having a usage frequency percentage greater than 55%). As another example, evaluation of the usage frequency criterion may include comparison of the various code segments, e.g., a usage frequency criterion identifying the code segments with the five highest determined usage frequencies (or any other configurable number, such as three, ten, fifty, etc.).

In the example shown in FIG. 2, the segment identification engine 108 determines the set of code segments 221 as the code segments of the application code 210 satisfying the usage frequency criterion. In the particular example shown in FIG. 2, the segment identification engine 108 applies a usage frequency criterion that is satisfied by the application files in the application code 210 with the three highest determined usage frequencies (shown as the .js files for the set of code segments 221 in FIG. 3). To determine the set of code segments 221 in this example, the segment identification engine 108 may determine the usage frequencies of the code segments as a number of other application files using an application file, track the determined usage frequencies in a ranked list or sorted table, and identify the set of code segments 221 satisfying the usage frequency criterion as the top three entries in the ranked list or sorted table.

Turning to change frequency, the segment identification engine 108 may identify a set of code segments that satisfy a change frequency criterion. In some examples, the segment identification engine 108 identifies change frequency as a number of commit actions applied to a particular code segment, though other measures are possible. A commit action may include any action that saves a change to a code segment, such as code check-ins for a source control program or any other source code version control system. Such programs or systems may expose application program interfaces (APIs) by which the segment identification engine 108 may extract the number of commit actions applied to the various code segments of the application code 210 or determine a total number of commit actions applied for the application code 210.

Upon determining the change frequencies of the code segments, the segment identification engine 108 may determine which of the code segments have a change frequency that satisfies a change frequency criterion. The change frequency criterion may specify a particular change frequency threshold value to exceed in order to satisfy the change frequency criterion (e.g., greater than 50 commit actions in a predetermined time period or greater than 20% of the total number of commit actions applied to the application code in the predetermined time period). As another example, the change frequency criterion may be evaluated through comparison of the various code segments, e.g., the code segments in the application code 210 with the three highest determined change frequencies.

Continuing the specific example shown in FIG. 2, the segment identification engine 108 determines the set of code segments 222 as the code segments satisfying the change frequency criterion. In the particular example shown in FIG. 2, the segment identification engine 108 applies a change frequency criterion that is satisfied by the application files in the application code 210 with the three highest determined change frequencies (e.g., the three .js application files with the greatest number of commit actions applied during week 8 of an application development cycle as shown for the set of code segments 222). Thus, to determine the set of code segments 222 in this example, the segment identification engine 108 may determine the change frequencies of the code segments in the application code 210 as a number of commit actions applied to a particular application file during week 8 of the application development cycle, track the determined change frequencies in a ranked list or sorted table, and identify the set of code segments 222 satisfying the change frequency criterion as the top three entries in the ranked list or sorted table.

As discussed above, the segment identification engine 108 may identify the set of code segments 221 and 222 for a code coverage threshold update. The segment identification engine 108 may do so through identification of code segments with usage frequencies or change frequencies that, for example, exceed "high" frequency thresholds as specified by various criteria. As such, the segment identification engine 108 to identify high-importance or high-relevance code segments for code coverage threshold updates, where the importance of such code segments may be configured and tailored by the specific identification criteria applied to the code segment identification. The segment identification engine 108 may support determination code segments of a high-importance or high-relevance for a particular time period (e.g., a week, a release cycle, a development phase, a code sprint, etc.), for example through application of both usage frequency criteria and change frequency criteria.

In some examples, the segment identification engine 108 may exclude certain code segments from consideration for the code coverage threshold update. For instance, the segment identification engine 108 may exclude legacy files, third-party files, or other categories of application files. Legacy files and third-party files may have a significant impact on application functionality (e.g., as evidenced through a high usage frequency), but may not warrant a high code coverage thresholding require time and cost expenditures to develop suitable test suites. Moreover, legacy files may have already undergone stringent testing and quality verifications in the past, remaining unchanged since such testing and quality verifications were performed. Third-party files may have already been tested and verified by other parties, and applying code coverage thresholds to these third-party files may be an inefficient use of time and resources. Thus, the segment identification engine 108 may exclude such files from consideration, which may result in increased efficiency for meeting determined code coverage thresholds.

To exclude certain code segments, the segment identification engine 108 may filter certain files or directory paths in an application directory structure from consideration. The segment identification engine 108 may do so at various phases of the code segment identification process, such as by excluding the certain code segments from the usage or change frequency determinations, by filtering the certain code segments from a ranked list or sorted table in preparation for applying usage or change frequency criteria, or by not applying the usage and change frequency criteria to the certain code segments (which would prevent the segment identification engine 108 from determining these certain code segments satisfy the usage and change frequency criteria). Thus, the segment identification engine 108 may identify sets of code segments that satisfy various identification criteria, such as usage and change criteria.

Figure 3:
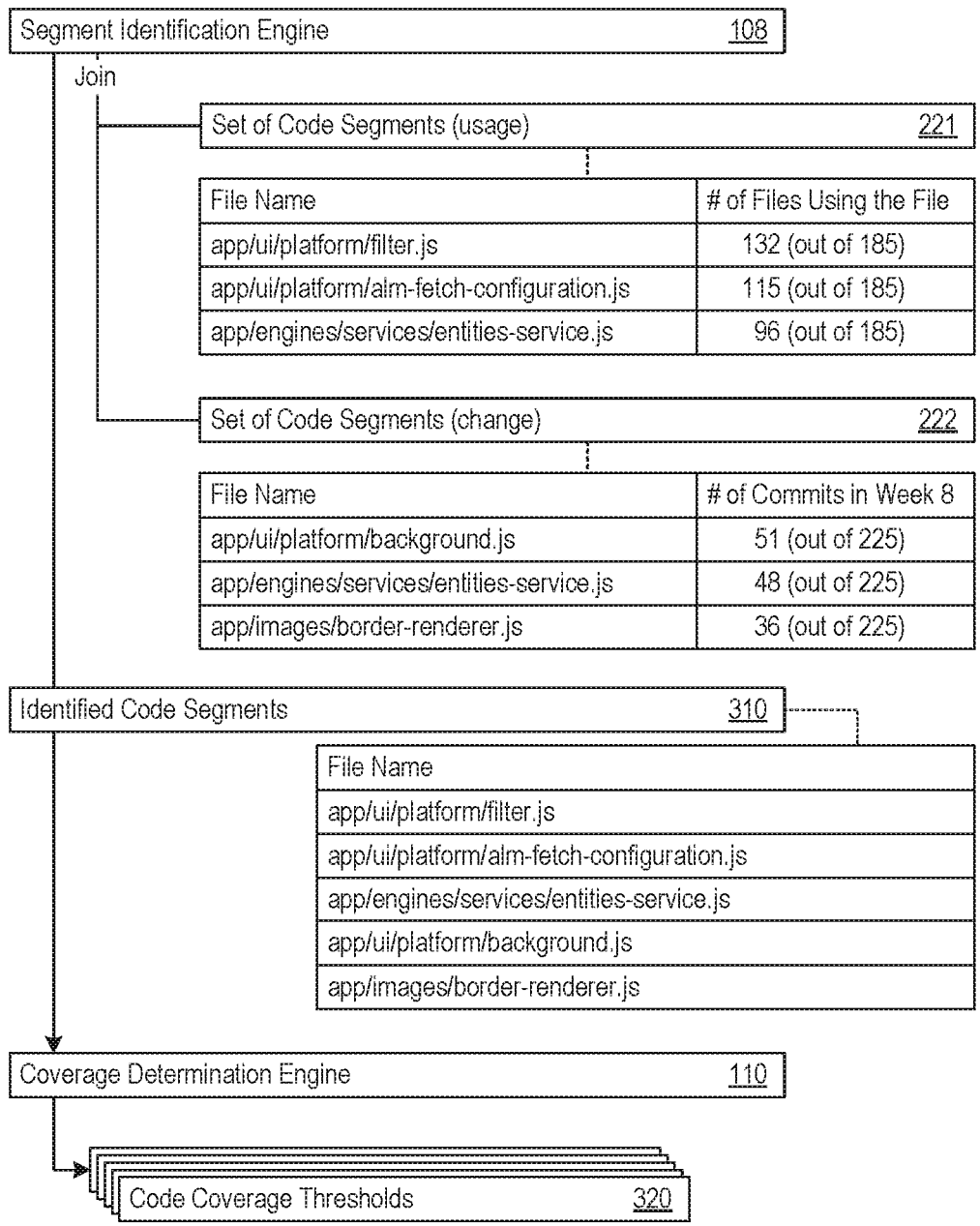
FIG. 3 shows an example of code coverage thresholds that a coverage determination engine may determine for a set of code segments identified by a segment identification engine.

FIG. 3 shows an example of code coverage thresholds that the coverage determination engine 110 may determine for a set of code segments identified by the segment identification engine 108. The example shown in FIG. 3 may continue the example in FIG. 2, in that the segment identification engine 108 may identify a set of code segments 221 that satisfy a usage frequency criterion and a set of code segments 222 satisfy a change frequency criterion.

The segment identification engine 108 may join multiple sets of code segments that match various identification criteria to provide to the coverage determination engine 110 for a code coverage threshold update. To illustrate through FIG. 3, the segment identification engine 108 may join the set of code segments 221 (satisfying the usage frequency criterion) with the set of code segments 222 (satisfying the change frequency criterion) to compile the set of identified code segments 310 for the code coverage threshold update. The identified code segments 310 may thus include any code segment in at least one of the set of code segments 221 and the set of code segments 222. In FIG. 3, the identified code segments 310 various files, including the application files "app/ui/platform/filter.js" and "app/ui/platform/alm-fetch-configuration.js" (which are part of the set of code segments 221 but not the set of code segments 222), the application files "app/ui/platform/background.js" and "app/images/border-renderer.js" (which are part of the set of code segments 222 but not the set of code segments 2221), and the application file "app/engine/services/entities-service.js" (which is part of both of the sets 221 and 222).

The coverage determination engine 110 may update the code coverage thresholds for the code segments identified by the segment identification engine 108. In some examples, the coverage determination engine 110 updates the code coverage threshold of a code segment by determining an initial code coverage threshold for the code segment, though the initial code coverage threshold of the code segment may be user-specified or determined without accounting for the usage and change frequency of the code segment as well. In other examples, the coverage determination engine 110 updates the code coverage threshold of a code segment by updating a previous code coverage threshold applied to the code segment. The previous code coverage threshold may refer to any previously determined code coverage threshold or any code coverage threshold applied to the code segment at a time previous to the code coverage threshold update. Thus, a previous code coverage threshold for a code segment may include a "current" code coverage threshold applied to the code segment as the current code coverage threshold was previously determined and previously applied.

To update the code coverage threshold of the identified code segments 310, the coverage determination engine 110 may account for previous code coverage levels for the identified code segments 310, the determined usage frequencies of the identified code segments 310, and the determined change frequencies of the identified code segments 310. A previous code coverage level may refer to a degree at which a code segment was previously tested (e.g., by a developed test suite). The previous code coverage level may thus include or specify an actual coverage level achieved for a code segment, which may be higher that a previous code coverage threshold. As an illustration, a test suite may test 85% of a particular code segment with a current code coverage threshold of 65%. In this example, the previous code coverage level may refer to the 85% coverage level achieved by the test suite. Though, in some examples, the previous code coverage level may additionally or alternatively specify a previous code coverage threshold.

The coverage determination engine 110 may update the code coverage threshold for a code segment based on a usage frequency and change frequency of the code segment, and further based on the previous code coverage level of the code segment. In some implementations, the coverage determination engine 110 may update the code coverage threshold for a particular code segment by selecting between the previous code coverage level and a weighted sum of the usage frequency of the particular code segment and the change frequency of the particular code segment. Such a selection may be implemented through a code coverage adjustment function, for example the following function applied to an example application file $File_A$:

$$\text{CoverageThreshold}(File_A) = \text{Max}(\text{PreviousCoverage}, W_1 * Usage_A + W_2 * Change_A)$$

In this example, the function input "PreviousCoverage" may refer to a previous code coverage level for $File_A$ (e.g., a previous coverage level of $File_A$ tested by a test suite or the current code coverage threshold applied to $File_A$). The function input Usage, may refer to a determined usage frequency of $File_A$ and the function input Change; may refer to a determined change frequency of $File_A$. The function parameters $W_1$ and $W_2$ may refer to weights that a user may specify to configure the degree which the usage frequency and change frequency are weighted in determination of the code coverage threshold.

In some examples, the weights $W_1$ and $W_2$ applied by the coverage determination engine 110 may have values between 0 and 1, and together sum to 1. Thus, weight values for $W_1$ and $W_2$ of 0.5 and 0.5 respectively may weigh the usage frequency and change frequency of a code segment equally in determination of an updated code coverage threshold. As another illustrative example, weight values for $W_1$ and $W_2$ of 0.75 and 0.25 respectively may result in a greater weight applied to the determined usage frequency of a code segment in comparison to the determined change frequency of the code segment.

The coverage determination engine 110 may normalize the determined usage frequency and change frequency of a code segment to a scale comparable to the previous code coverage level of the code segment. When the previous code coverage level of a particular code segment specifies a threshold percentage value, the coverage determination engine 110 may normalize the usage frequency to a percentage or ratio and do so similarly for the change frequency. In such an example, the coverage determination engine 110 may normalize the usage frequency to specify a ratio of, for example, a number of other code segments in the application code that use particular code segment to the total number of code segments in the application code. In a similar manner, the coverage determination engine 110 may normalize the change frequency of the particular code segment to specify a ratio of, for example, a number of commit actions applied to the particular code segment over a predetermined period of time to a total number of commit applications applied for the application code over the predetermined period of time.

To provide a specific example illustrating some of the features described above, the coverage determination engine 110 may update the code coverage threshold of the application file "app/ui/platform/filter.js" among the identified code segments 310 in FIG. 3. In this illustration, the application file "app/ui/platform/filter.js" may have a previous code coverage level of 62.33% (e.g., a coverage level previously reached for the file), a determined usage frequency of 96 other files using this file (out of 185 total application files), and a determined change frequency of 25 commit actions applied (out of 225 total commit applications applied to the application code). In updating the code coverage threshold for the file "app/ui/platform/filter.js", the coverage determination engine 110 may normalize the usage frequency to a ratio of 96/185, and thus a value of 51.89%. Along similar lines, the coverage determination engine 110 may normalize the change frequency to a ratio of 25/225, and thus a value of 11.11%.

Using these normalized usage and change frequency values, the coverage determination engine 110 may select between the previous code coverage level and a weighted sum of the normalized usage and change frequencies. When weighted equally (e.g., $W_1$ and $W_2$ are both 0.5), the coverage determination engine 110 may select the greater value between 62.33% (previous code coverage level) and 31.50% (the weighted sum calculated as 0.5*51.89%+0.5*11.11%), Thus, as illustrated through this specific example, the coverage determination engine 110 may update the code coverage threshold of a particular code segment by determining to keep the code coverage threshold of the particular code segment at the previous code coverage level. In other examples, the coverage determination engine 110 may update the code coverage threshold by adjusting the code coverage threshold to a weighted sum of the determined change frequency and the determined usage frequency (or normalized values thereof).

As described above, the coverage determination engine 110 may update the code coverage threshold of a particular code segment. The coverage determination engine 110 may update the code coverage threshold for each of the code segments among the identified code segments 310 determined by the segment identification engine 108. Thus, the coverage determination engine 110 may update the code coverage threshold for each of the five application files specified in the identified code segments 310 in FIG. 3. In FIG. 3, the coverage determination engine 110 determines the code coverage thresholds 320 for the identified code segments 310.

Figure 4:
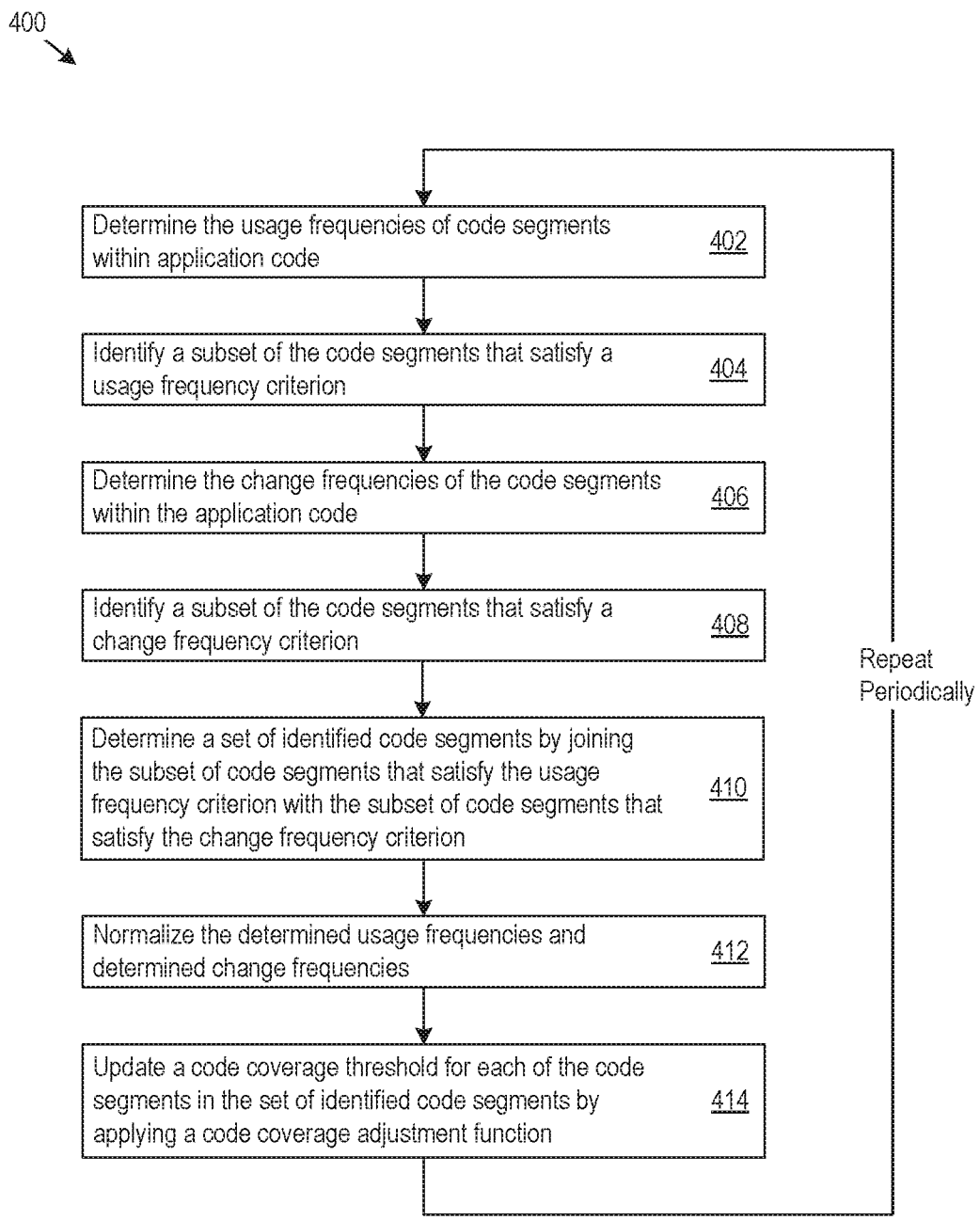
FIG. 4 shows a flow chart of an example method for code coverage threshold determination.

FIG. 4 shows a flow chart of an example method 400 for code coverage threshold determination. Execution of the method 400 is described with reference to the segment identification engine 108 and the coverage determination engine 110, though any other device, logic, hardware-programming combination, or other suitable computing system may execute any of the steps of the method 400. As examples, the method 400 may be implemented in the form of executable instructions stored on a machine-readable storage medium and/or in the form of electronic circuitry.

The method 400 may include determining the usage frequencies of code segments within application code (402). In some implementations, the segment identification engine 108 may determine the usage frequency for some of the code segments within the application code, and in doing so the segment identification engine 108 may forego (e.g., exclude) determination of the usage frequencies of certain code segments, such as legacy application files or third-party application files. The method 400 may also include identifying a subset of the code segments that satisfy a usage criterion, e.g., the X number of code segments with the highest determined usage frequencies (e.g., top 5) or the code segments that exceed a predetermined usage frequency threshold (e.g., >60% usage).

The method 400 may further include determining the change frequencies of the code segments within the application code (406) and identifying a subset of the code segments that satisfy a change frequency criterion (408). The segment identification engine 108 may perform these steps in any of the ways described above and according to any measure of change frequency (e.g., as a number of commit actions applied to code segments over a predetermined time period).

The method 400 may also include determining a set of identified code segments by joining the subset of code segments that satisfy the usage frequency criterion with the subset of code segments that satisfy the change frequency criterion (410). In executing this step, the segment identification engine 108 may generate a set of identified code segments to update a code coverage threshold for, which may include code segments that satisfy at least one of the usage frequency criterion and the change frequency criterion. Thus, identification of code segments by the segment identification engine 108 may select code segments with high impact on the application (e.g., relatively higher usage frequency through satisfaction of the usage frequency criterion) as well as code segments undergoing development (e.g., relatively higher change frequency trough satisfaction of the change frequency criterion). The segment identification engine 108 may communicate the identified code segments to a coverage determination engine 110 for the code coverage threshold update.

Regarding updating the code coverage thresholds of identified code segments, the method 400 may include normalizing the determined usage frequencies and determined change frequencies (412). For example, the coverage determination engine 110 may do so to support common scale comparison with previous code coverage levels of the set of identified code segments. The method 400 may further include updating a code coverage threshold for each of the code segments in the set of identified code segments by applying a code coverage adjustment function. The coverage determination engine 110 may implement the code coverage adjustment function to select between the previous code coverage level for a particular code segment and a weighted sum of the normalized usage frequency and change frequency of the particular code segment. The coverage determination engine 110 may thus update code coverage thresholds based on previous code coverage levels, determined usage frequencies, and determined change frequencies.

The method 400 may be performed by the segment identification engine 108 and the coverage determination engine 110 multiple times, e.g., periodically at any configurable rate, on-demand, or combinations of both. In performing the method 400 multiple times during application development, different code segments may be identified during each iteration of the method 400, and thus different code segments may undergo updates to the code coverage thresholds applicable to these different code segments.

For an execution of the method 400 for a particular time period (week, code release, development sprint, etc.), the method 400 may flexibly identify and update the code coverage threshold for code segments that satisfy at least one of the usage frequency criterion and the change frequency criterion at that particular time (which may be indicative of critical code segments or developing code segments undergoing changes and development at a relatively high rate during that particular time period). As the application code evolves during development, continued execution of the method 400 at different points in time may support dynamic identification and code coverage thresholds updates for code segments identified as high-relevance or high-priority at a particular point in time. Such features may assist in effectively deploying resources to develop test suites and test mechanisms to meet code coverage thresholds of these high-relevance or high-priority code segments.

Although one example was shown in FIG. 4, the method 400 may include any number of additional or alternative steps as well, including steps implementing any other features described herein with respect to the segment identification engine 108, the coverage determination engine 110, or both.

Figure 5:
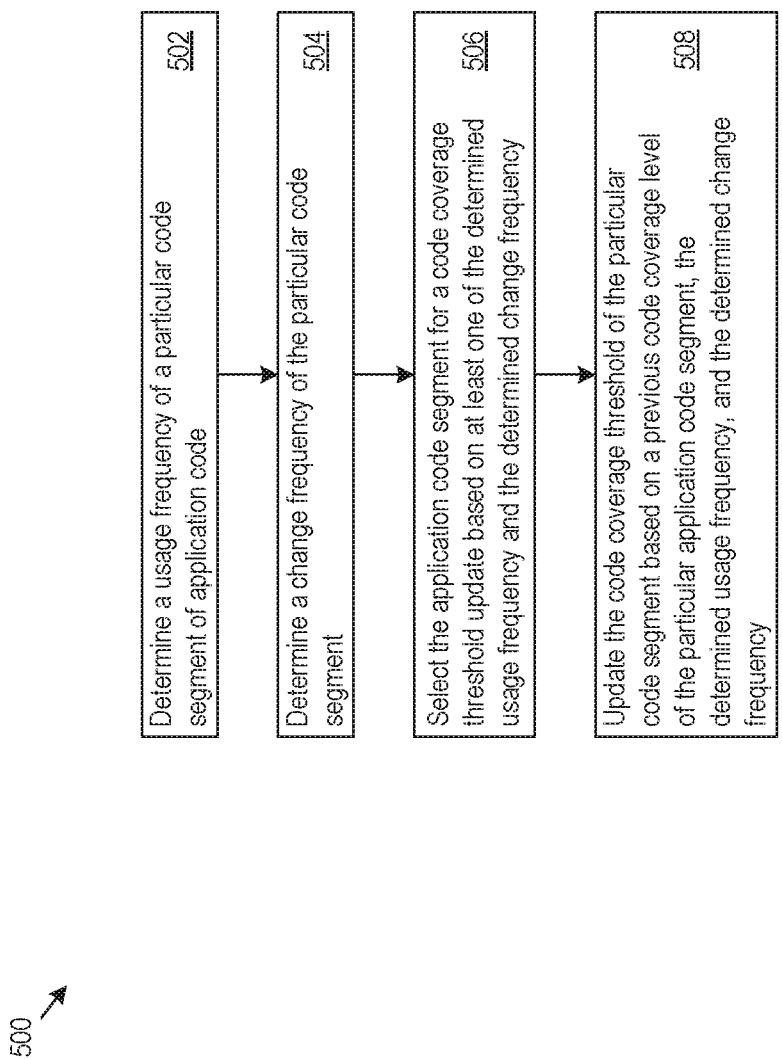
FIG. 5 shows a flow chart of another example method for code coverage threshold determination.

FIG. 5 shows a flow chart of another example method 500 for code coverage threshold determination. Execution of the method 500 is described with reference to the segment identification engine 108 and the coverage determination engine 110, though any other device, logic, hardware-programming combination, or other suitable computing system may execution any of the steps of the method 500. The method 500 may be implemented in the form of executable instructions stored on a machine-readable storage medium and/or in the form of electronic circuitry, for example.

The method 500 may include determining a usage frequency of a particular code segment of application code (502), determining a change frequency of the particular code segment (504), and selecting the particular code segment for a code coverage threshold update based on at least one of the determined usage frequency and the determined change frequency (506). The segment identification engine 108 may perform these steps of the method 500 in identifying code segments from application code. Selecting the particular code segment by the segment identification engine 108 may include determining the usage frequency of the particular code segment satisfies at least one of a usage frequency criterion and a change frequency criterion.

The method 500 may also include updating the code coverage threshold of the particular code segment based on a previous code coverage level of the particular code segment, the determined usage frequency, and the determined change frequency (508), which the coverage determination engine 110 may perform. In some implementations, updating the code coverage threshold (508) by the coverage determination engine 110 may include determining the code coverage threshold as the greater value between the previous code coverage level and a weighted sum of the usage frequency and the change frequency.

As such, updating the code coverage threshold may include determining to keep the code coverage threshold of the particular code segment at the previous code coverage level in some examples. In other examples, updating the code coverage threshold may instead result in adjusting the code coverage threshold to a weighted sum of the determined change frequency and the determined usage frequency. The usage frequency may specify a ratio of a number of other code segments in the application code that use the particular code segment to a total number of code segments in the application code and the change frequency may specify ratio of a number of commit actions applied to the code segment over a predetermined period of time to a total number of commit applications applied for the application code over the predetermined period of time. When the usage frequency or change frequency does not specify a ratio (or percentage), the coverage determination engine 110 may normalize the usage frequency or the change frequency used in calculating the weighted sum. As yet another example While some example steps are shown in FIG. 5, the method 500 may include any number of additional or alternative steps as well, including steps implementing any other features described herein with respect to the segment identification engine 108, the coverage determination engine 110, or both.

Figure 6:
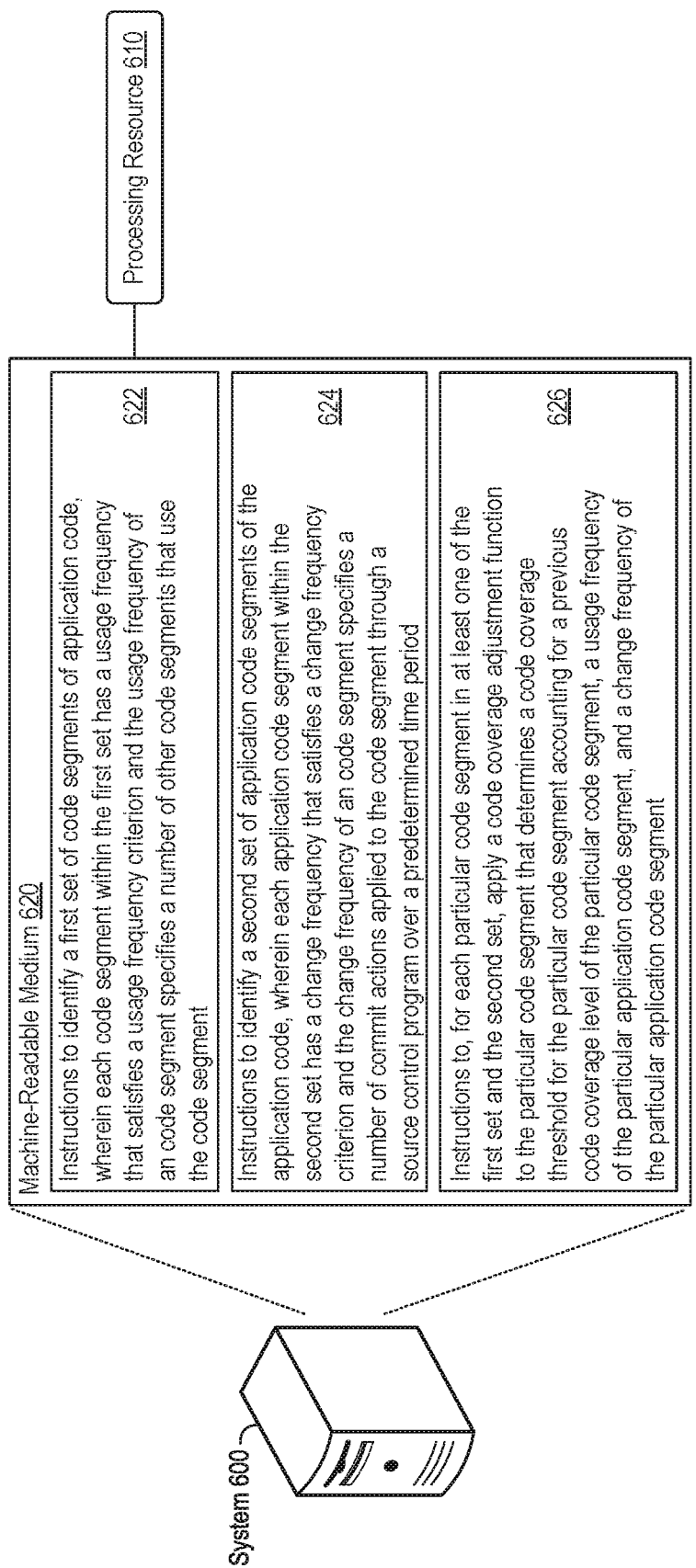
FIG. 6 shows an example of a system that supports determination of code coverage thresholds for code segments based on usage frequencies and change frequencies of the code segments.

FIG. 6 shows an example of a system 600 that supports determination of a code coverage threshold for a code segment based on a usage frequency and a change frequency of the code segment. The system 600 may include a processing resource 610, which may take the form of a single or multiple processors. The processor(s) may include a central processing unit (CPU), microprocessor, or any hardware device suitable for executing instructions stored on a machine-readable medium, such as the machine-readable medium 620 shown in FIG. 6. The machine-readable medium 620 may be any non-transitory electronic, magnetic, optical, or other physical storage device that stores executable instructions, such as the instructions 622, 624, and 626 in FIG. 6. As such, the machine-readable medium 620 may be, for example. Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 600 may execute instructions stored on the machine-readable medium 620 through the processing resource 610. Executing the instructions may cause the system 600 to perform any of the code coverage threshold features described herein, including according to any features of the segment identification engine 108, the coverage determination engine 110, or both.

For example, execution of the instructions 622, 624, and 626 by the processing resource 610 may cause the system 600 to identify a first set of code segments of application code, wherein each code segment within the first set has a usage frequency that satisfies a usage frequency criterion and the usage frequency of a code segment specifies a number of other code segments in the application code that use the code segment (instructions 622); identify a second set of code segments of the application code, wherein each code segment within the second set has a change frequency that satisfies a change frequency criterion and the change frequency of a code segment specifies a number of commit actions applied to the code segment through a source control program over a predetermined time period (instructions 624); and for each particular code segment in at least one of the first set and the second set apply a code coverage adjustment function to the particular code segment that determines a code coverage threshold for the particular code segment based on a previous code coverage level of the particular code segment, the usage frequency of the particular code segment, and the change frequency of the particular code segment (instructions 626).

In some examples, the machine-readable medium 620 may include instructions executable by the processing resource 610 further to determine not to apply the code coverage adjustment function for other code segments of the application code not in the first set and not in the second set of code segments. While some example instructions have been shown and described, the machine-readable medium 620 may include instructions executable by the processing resource 610 to implement or perform any of the features described in, including any features described with respect to the segment identification engine 108 and the coverage determination engine 110.

The systems, methods, devices, engines, and processes described above, including the segment identification engine 108 and the coverage determination engine 110, may be implemented in many different ways in many different combinations of hardware, logic, circuitry, and executable instructions stored on a machine-readable medium. For example, the segment identification engine 108, the coverage determination engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits, A product, such as a computer program product, may include a storage medium and machine readable instructions stored on the medium, which when executed in an endpoint, computer system, or other device, cause the device to perform operations according to any of the description above, including according to any features of the segment identification engine 108, the coverage determination engine 110, or both.

The processing capability of the systems, devices, and engines described herein, including the segment identification engine 108 and the coverage determination engine 110, may be distributed among multiple system components, such as among multiple processors and memories, which may include multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
   a segment identification engine to:
      identify a first subset of a plurality of code segments in application code, wherein each code segment in the first subset has a usage frequency that satisfies a usage frequency criterion;
      identify a second subset of the plurality of code segments, wherein each code segment in the second subset has a change frequency that satisfies a change frequency criterion, wherein the change frequency specifies a number of commit actions applied to the code segment over a predetermined period of time; and
      identify a joined subset comprising each code segment that is included in both the first and second subsets; and
   a coverage determination engine to, for each code segment included in the joined subset, update a code coverage threshold for the code segment based on the usage frequency of the code segment and the change frequency of the code segment.

2. The system of claim 1, wherein the coverage determination engine is to, for each code segment included in the joined subset, update the code coverage threshold further based on a previous code coverage level of the code segment.

3. The system of claim 2, wherein the coverage determination engine is to, for each code segment included in the joined subset, update the code coverage threshold by selecting between the previous code coverage level and a weighted sum of the usage frequency and the change frequency.

4. The system of claim 1, wherein the usage frequency of each code segment specifies a number of other code segments in the application code that use the code segment.

5. The system of claim 1, wherein the usage frequency of each code segment specifies a ratio of a number of other code segments in the application code that use the code segment to a total number of code segments in the application code.

6. The system of claim 1, wherein the coverage determination engine is to, for each code segment included in the joined subset, normalize the usage frequency of the code segment based on a scale associated with a previous code coverage level of the code segment.

7. The system of claim 6, wherein the coverage determination engine is to, for each code segment included in the joined subset, normalize the change frequency of the code segment based on the scale associated with the previous code coverage level of the code segment.

8. A method comprising:
   identifying, by a segment identification engine, a first subset of a plurality of code segments in application code, wherein each code segment in the first subset has a usage frequency that satisfies a usage frequency criterion;
   identifying, by the segment identification engine, a second subset of the plurality of code segments, wherein each code segment in the second subset has a change frequency that satisfies a change frequency criterion, wherein the change frequency specifies a number of commit actions applied to the code segment over a predetermined period of time;
   identifying, by the segment identification engine, a joined subset comprising each code segment that is included in both the first and second subsets; and
   updating, for each code segment included in the joined subset, a code coverage threshold of the code segment based on a previous code coverage level of the code segment, the usage frequency of the code segment, and the change frequency of the code segment.

9. The method of claim 8, wherein updating the code coverage threshold for each code segment included in the joined subset comprises determining to keep the code coverage threshold of the code segment at the previous code coverage level.

10. The method of claim 8, wherein updating the code coverage threshold for each code segment included in the joined subset comprises adjusting the code coverage threshold to a weighted sum of the change frequency and the usage frequency.

11. The method of claim 10, wherein the usage frequency of each code segment included in the joined subset specifies a ratio of a number of other code segments in the application code that use the code segment to a total number of code segments in the application code.

12. The method of claim 8, wherein updating the code coverage threshold for each code segment included in the joined subset comprises determining the code coverage threshold for each code segment as a greater value between the previous code coverage level and a weighted sum of the usage frequency and the change frequency of the code segment.

13. The method of claim 8, comprising, for each code segment included in the joined subset, normalizing the usage frequency of the code segment based on a scale associated with the previous code coverage level of the code segment.

14. The method of claim 8, comprising, for each code segment included in the joined subset, normalizing the change frequency based on a scale associated with the previous code coverage level of the code segment.

15. A non-transitory machine-readable medium comprising instructions executable by a processing resource to:
    identify a first subset of a plurality of code segments of application code, wherein each code segment within the first subset has a usage frequency that satisfies a usage frequency criterion and wherein, for each code segment in the first subset, the usage frequency of the code segment specifies a number of other code segments in the application code that use the code segment;
    identify a second subset of the plurality of code segments of the application code, wherein each code segment within the second subset has a change frequency that satisfies a change frequency criterion and wherein, for each code segment in the second subset, the change frequency of the code segment specifies a number of commit actions applied to the code segment through a source control program over a predetermined time period;
    identify a joined subset comprising each code segment that is included in both the first and second subsets; and
    for each code segment in the joined subset, apply a code coverage adjustment function to the code segment to determine a code coverage threshold for the code segment based on a previous code coverage level of the code segment, the usage frequency of the code segment, and the change frequency of the code segment.

16. The non-transitory machine-readable medium of claim 15, wherein the instructions are further executable by the processing resource to:
    not to apply the code coverage adjustment function for other code segments of the application code not in the first subset and not in the second subset of the plurality of code segments.

17. The non-transitory machine-readable medium of claim 15, wherein the instructions are further executable by the processing resource to:
    for each code segment included in the joined subset, determine a weighted sum of the usage frequency of the code segment and the change frequency of the code segment.

18. The non-transitory machine-readable medium of claim 17, wherein the instructions are further executable by the processing resource to:
    for each code segment included in the joined subset, determine the code coverage threshold as a greater value between the previous code coverage level and the weighted sum of the usage frequency and the change frequency.

19. The non-transitory machine-readable medium of claim 17, wherein the instructions are further executable by the processing resource to:
    for each code segment included in the joined subset, determine the weighted sum based on a first weight value associated with the usage frequency of the code segment and a first weight value associated with the change frequency of the code segment.

20. The non-transitory machine-readable medium of claim 15, wherein the instructions are further executable by the processing resource to:
    for each code segment included in the joined subset, normalize the usage frequency and the change frequency of the code segment based on a scale associated with the previous code coverage level of the code segment.

* * * * *